United States Patent Office 3,128,354
Patented Apr. 7, 1964

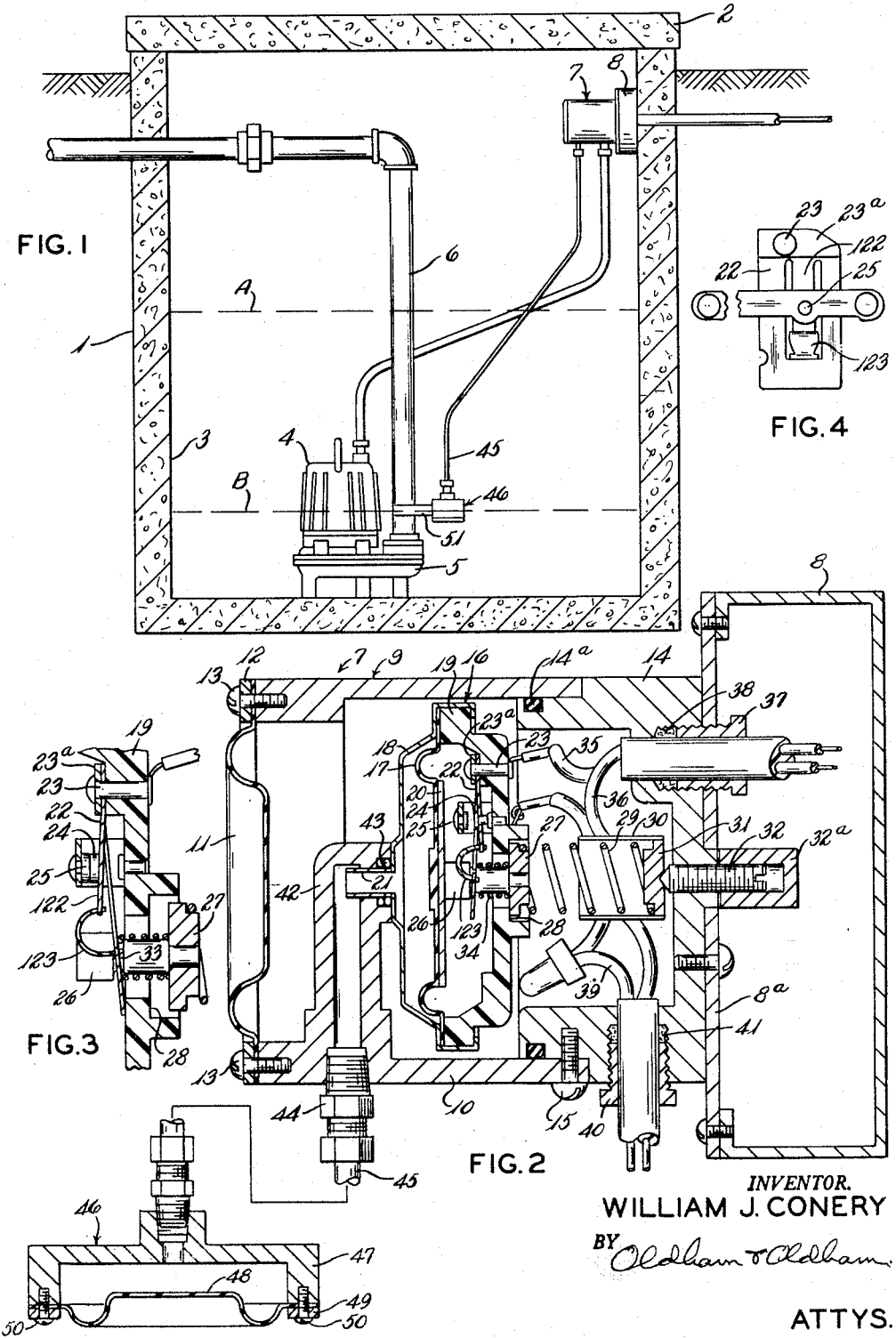

3,128,354
SEALED LEVEL CONTROL SWITCH FOR SUMP PUMPS OR THE LIKE
William J. Conery, Ashland, Ohio, assignor to Hydr-O-Matic Pump Company, Hayesville, Ohio, a corporation of Ohio
Filed July 10, 1962, Ser. No. 208,769
6 Claims. (Cl. 200—83)

The present invention relates to control switches, and especially to a sealed control switch particularly adapted for connection to an electric pump to regulate, automatically, the level of fluids in a sump, bilge, or similar container.

Heretofore the use of automatically controlled electric motors for driving sump, bilge and other pumps for automatically pumping fluid from such sump or other container when the level of the fluid in the container reaches a predetermined height, and to terminate pump and motor operations when the fluid level has been reduced to a desired value, has been proposed. Such electric motor and pump controls have normally been operated under the pressure conditions set up in the sump or other container and the controls have been primarily incorporated within the pump housing, or are secured to the exterior of the pump housing within a separate housing compartment and are connected to the motor by suitable electric leads. The operating controls used heretofore have usually included at least one pressure sensitive diaphragm that is exposed to the source of actuating pressure and that has a switch means operatively associated with the pressure sensitive diaphragm and controlled by the position of the diaphragm to be actuated thereby when the diaphragm is displaced by the actuating pressure and to release the switch, or open it and its control circuit, when the pressure of the controlled fluid or body of material is reduced to a desired minimum.

These pump controls used previously are submerged in the liquid in the sump and have a power cable connecting thereto. The power cable usually has a small air vent tube provided therein and open at the power supply end of the cable so that atmospheric pressure can be transmitted to the switch chamber. As all of these sumps and similar chambers have a lot of moisture or dampness therein, moisture can enter the tube and be drawn into the switch chamber to result in eventual switch failure. Efforts to run a separate vent tube from the switch chamber to a dry location for receipt of atmospheric pressure have not been completely satisfactory.

It will be realized that the control means provided heretofore, when they are operatively associated directly with the motor driven pump, will generally, if not always, be completely immersed in the body of controlled material and that liquid or dampness may seep into these pressure controls and interfere with their functioning. Efforts have been made to isolate the control means and the pressure sensitive diaphragm from the actual electrical switch means, but it is difficult to maintain these automatic electrical controls in absolutely dry conditions over long periods of service life. In all events, the constructions provided heretofore have been satisfactory for many purposes, but it is difficult to insure that the automatic controls will function properly over long periods of time and that they will be actuated at the predetermined actuation and release pressures for limiting the top and bottom levels of the fluid materials received in the sump, or other container.

The general object of the present invention is to provide a sealed control switch adapted to be positioned in remote association with a unit, such as an electrically actuated sump pump, for automatically controlling the level of material in the sump to desired ranges and where the control switch is characterized by its accurate control characteristics under varied temperature and pressure conditions.

Another object of the invention is to provide a sealed level control switch having a pressure sensitive switch unit therein for use with electrically driven sump pumps and the like and where such control switch is adapted to adjust automatically the pressure applied to the enclosed switch unit to atmospheric.

A further object of the invention is to provide a control switch for electrically driven sump pumps or the like and where such control switch is adapted to be actuated on small pressure variations and where the control switch includes an uncomplicated enclosure means that has a standard switch unit positioned therein.

The foregoing and other objects and advantages of the invention will be made more apparent as the specification proceeds.

Attention now is particularly directed to the accompanying drawings, wherein:

FIG. 1 is a vertical section of a typical sump having a conventional sump pump unit and a control switch, embodying the principles of the invention, positioned in remote association to the sump pump unit;

FIG. 2 is an enlarged vertical section through the sealed level control switch of FIG. 1 and having a pressure control unit shown in vertical section and diagrammatically connected to the control switch proper;

FIG. 3 is an enlarged fragmentary section through a portion of the switch unit with a movable member therein in a different position than shown in FIG. 2; and FIG. 4 is a detailed elevation of the control arm and associated contact and positioning means.

When referring to corresponding members shown in the drawings and referred to in the specification, corresponding numerals are used to facilitate comparison therebetween.

The present invention generally relates to a sealed level control switch for sump pumps and the like and where the novel control switch includes an enclosure means having a pressure responsive means forming one portion thereof whereby the pressure set up within the enclosure means corresponds to that of the surrounding atmosphere, a pressure actuated switch unit positioned within the enclosure, a pressure transmitter means connecting to the pressure actuated switch unit and extending at least to the enclosure means for engaging a control pressure means, and electric power and control means extending through said enclosure means in sealed engagement therewith and connecting to the switch unit whereby the action of the switch unit can be translated to remotely positioned parts for operating them dependent upon the pressure of the control pressure means.

Attention now is particularly directed to the details of the structure shown in the accompanying drawings, and a suitable chamber forming member 1 is shown positioned substantially completely below the surface of the ground with only a top portion 2 of the chamber forming member being shown exposed above the ground. This chamber forming member is of any suitable construction and is illustrated to show the formation of a sump 3 within the member 1 where refuse liquids, or other liquid material is collected. As is conventional in chambers of this type, the sump 3 is provided with an electrically actuated sump pump 4 that normally is positioned at the bottom portion of the sump 3 as by means of some conventional support base 5. A liquid exhaust conduit 6 extends from the pump 4 and chamber 1 but is operatively connected to the pump for flow of liquids from the sump 3 when the pump 4 is actuated.

As it normally is not desirable to fill these sumps 3 with liquids, a top level line is indicated at A for the liquids within the sump 3 and a bottom level line B is indicated to show the desired limits for material in the sump.

As is conventional in members of this type, pressure actuated control means are provided to operate the sump pump 4 when the level of liquids in this chamber forming member 1 is raised to the height of the top level line A, and to terminate pump operation when the level of the liquids has been reduced to that of the bottom level line B. However, it is a particular and important feature of the present invention that a sealed level control switch 7 is provided for control of the pump 4 and with such sealed level control switch 7 being secured to an upper portion of the wall of the sump 3, as by being attached to a connection or terminal box 8 that is suitably secured to the wall portion of the chamber forming member 1 adjacent the top 2 of such member. In all events, this control switch 7 is positioned above the top fluid level line A and is not exposed to direct contact with the liquids received in the sump 3.

The details of the sealed level control switch 7 are shown in FIG. 2 where an adjustable pressure enclosure means 9 is provided and, for example, may be formed from a generally tubular section or member 10 which has a flexible diaphragm 11, formed from any suitable resilient material, such as rubber, attached to one end of the tubular section 10, as by means of an annular lock or retaining ring 12 and cap screws 13. The opposite end of the tubular section 10 is enclosed or completed, for example, by a cap unit 14 that is in telescoped but sealed engagement with the tubular section 10 and is secured thereto by means of cap screws 15. An O-ring, or similar seal 14a is provided between the overlapped sections or portions of the tubular section 10 and cap unit 14 whereby an air tight enclosure is formed for receipt of the switch unit, or means therein. However, by the presence of the flexible diaphragm 11, or other equivalent means, the pressures within the enclosure means 9 will be automatically balanced with the ambient, or external pressures set up within the chamber forming member 1. Naturally the enclosure means 9 and units or members positioned therein will all be at substantially the same temperature as the surrounding atmosphere at all times.

A pressure actuated, diaphragm type switch unit 16 is provided within the enclosure means 9 and is of any conventional construction. In this particular embodiment of the invention, the switch unit 16 is shown as having a flexible diaphragm 17 extending transversely of the switch unit 16 and attached at its margins to a metal enclosure or frame 18 forming a portion of the switch unit. An insulated base 19 is secured to the metal frame 18 to complete an enclosure therewith. The flexible diaphragm 17 is made from any suitable material, usually a rubber or synthetic rubber material or equivalent, and it carries a metal disk 20 thereon to aid in maintaining the center portion of the diaphragm flat and to facilitate axial movement of the diaphragm in the switch unit. For reasons to be described hereinafter in more detail, a pressure transmitting port or bore 21 is provided in the metal frame 18 for application of a control pressure to one face of the diaphragm 17.

The opposite face of the diaphragm 17 has certain switch means associated therewith the opening and closing of which is to be controlled by the pressures existing on opposite sides of the diaphragm 17. Thus, a resilient, flexible control arm 22 is secured at one end by a rivet 23 and a contact block 23a to the base 19 so that the control arm 22 extends out in cantilever relation to the adjacent portions of the base 19. A contact 24 is suitably secured to an independently movable contact arm 122 formed from a center portion of the control arm 22 extending from the contact block 23a. The contact 24 and its spring contact arm 122 are moved by the control arm 22 into and out of engagement with an associated contact 25 operatively positioned on the base 19 by a snap action through a spring connector 123 extending between an outer end portion of the control arm 22 and the free end of the arm positioning the contact 24.

The action of the control arm 22 is controlled through the flexible diaphragm 17 which is shown as having a control stud or member 26, usually made from an insulation material, secured to the disk 20 and extending therefrom to bear against a stop washer or member 27. This stop washer or member 27 is resiliently urged to seat on a shoulder 28 provided on the axially outer surface of the base 19 by a coil spring 29, partially positioned by a frame or bracket 30 at the sides of the coil spring. The axially outer end of the coil spring 29 has a control means which in this instance is shown as including an end disk, or washer 31 removably engaged therewith. This end disk or washer 31 is confined by the bracket 30 and has a member, such as a set screw 32, engaged therewith and threadably secured to the cap unit 14 whereby the set screw 32 can force the end disk or washer 31 axially inwardly of the enclosure means 9 to set up the desired compressive force on the coil spring 29 for controlling the switch closing action, and determining the height of the liquid level A at which pump action begins.

The stud 26 has a peripheral recess or slot 33 provided therein and an end portion of the control arm 22 is engaged with such slot 33 to set the position of the control arm by the position of the stud 26, as controlled by the diaphragm 17. Thus when the pressure exerted through the pressure transmitting port 21 is sufficient, it will cause the diaphragm 17 to move axially inwardly of the switch unit 16 and this will cause the stud 26 and the control arm 22 to move to cause engagement between the contact 24 and 25 and, for example, start the actuation of the electric motor controlling the pump 4 so as to reduce the level of liquid, or matter received in the sump 3. However, when this pressure, as transmitted through the pressure transmitting port 21 to the diaphragm 17 is so reduced by lowering the level of fluid in the sump 3, then a return spring 34, which is telescoped over one end portion of the stud 26 and extends between the stop washer 27 and the control arm 22, will set up sufficient pressure to move the control arm 22 and the diaphragm 17 axially towards the metal frame 18 to open the contacts 24 and 25, for example. Such action would automatically terminate drive of the electric motor controlling the action of the pump 4. The return spring 34 is selected of a strength to shut off the sump pump at a desired minimum level in the sump.

It will be realized that the pressure differentials controlling the operation of the pump 4 can be very small, such as only several ounces, or at the most a pound or two per square inch. The apparatus of the invention will have atmospheric pressure set up within the enclosure 9 and on the switch unit 16 in the contact containing section thereof at all times whereby desired accurate pressure differentials will actuate the switch unit at all times.

In the present embodiment of the invention, electric power supply leads and control leads are shown engaged with the enclosure means 9 by suitable sealed connections therewith, and for example, a pair of power supply leads 35 and 36 are shown extending through the cap unit 14 in sealed in engagement therewith. Such seal is provided by a tubular gland 37, bearing on suitable packing means 38, that is received in a recess provided in the cap unit 14 for forcing such packing means into sealed engagement with the assembly of the power leads 35 and 36. One of these leads 35 extends to the contact or rivet 23 that in turn is in good electrical contact with the control arm 22 for supplying energy thereto. Power through this power supply circuit is controlled by engagement of the contacts 24 and 25 and a lead 39 is shown extending from the contact 25 through a packing gland 40 and packing means 41 for air tight passage with the other power supply lead 36 through the cap unit 14. Such leads 36 and 39 extend down to the pump 4 for drive of the electric motor associated therewith.

FIG. 2 of the drawings shows that the pressure transmitting port 21 has some type of a tubular member 42 connected thereto and is in sealed engagement therewith, as by means of an O-ring 43, or the equivalent. Such tubular member 42, or any equivalent substituted therefor, provides a pressure transmitting bore or conduit extending from and engaging with one compartment provided within the pressure actuated switch unit 16 for supplying the actuating pressure thereto and to extend to a wall of the enclosure means 9. The tubular member 42 is shown as being formed integrally with the frame or tubular section 10 of the enclosure means of the apparatus of the invention and a tapped seat is provided at the end of the member 42 for a connection fitting 44 shown engaged therewith. Thus a pressure transmitting line or conduit 45 can be connected to such fitting 44 and extend to a pressure control or indicating unit 46. This pressure control unit 46, or control pressure receiving means, is adapted to be affixed to the pump 4 or associated means for immersion in the liquid received in the sump 3. The pressure sensitive or receiving unit is shown as comprising a cup 47 that is provided with a flexible diaphragm 48 secured over the open, downwardly directed lower end of such cup 47. The conduit 45 connects to the base of the cup 47. Thus as the pressures within the sump 3 vary, the pressures applied to the flexible diaphragm 48 will vary appreciably or correspondingly and this control pressure will be set up within the cup 47 and be transmitted to the diaphragm 17 and the switch unit 16 for control action therein.

A lock ring 49 is shown secured to the cup unit 47 by cap screws 50 to secure the diaphragm 48 tightly in position. Any suitable means, such as a bracket 51, carried by the conduit 6 fixedly secures the pressure control unit 46 to such sump pump assembly.

A cap 32a is secured to the outer end of the set screw 32. The control switch 7 may be positioned on a removable plate 8a forming part of the connection box 8 whereby access can be readily had to the control switch assembly from the top of the member 1. It should be realized that the control switch 7 can be used with any suitable container for automatically controlling the limits of levels of liquids received in the container and where pressures of the contained materials are used for control action.

From the foregoing, it will be seen that the actual pressure actuated switch unit 16 of the invention is removed from direct contact with the fluids received in the sump 3, but with such switch unit 16 being received within a sealed level control switch unit or apparatus whereby automatic control of the sump pump 4 can be obtained, and with such controls being free from variation in their action because of changes in the atmospheric temperatures and pressures. The sealed level control switch 7 normally will be of the same temperature as the surrounding atmosphere, and by the presence of the diaphragm 11 forming one wall of the enclosure in which the pressure actuated switch unit 16 is positioned, the pressures inside the enclosure means 9 will be automatically and continually balanced with those of the surrounding atmosphere. Hence a more accurate and better functioning control unit has been provided.

The compartment formed in the control switch 16 by the diaphragm 17 and the frame 18 has air sealed therein as well as in the tubular member 42, conduit 45, and pressure indicating unit 46 by the assembly of such members. Such enclosed air is the actuating means for the control switch 16 and any water in these means would change the switch calibration. Changes in the temperature of water in the sump causes the air to expand or contract in the chamber formed within the cup 47. The diaphragm 48 will move on such temperature changes so that in all instances the pressure within the pressure indicating unit 46 will balance with the static head of water in the sump to properly transmit such liquid pressure to the control switch 16 which has the enclosed pressure exerted on one face of the diaphragm 17 continually opposed by the atmospheric air pressure in the enclosure 9. This control unit is not exposed to direct fluid contact and corrosion by any of the contents of the sump 3 and will maintain the switch unit 16, for example, in a dryer condition for positive action over a longer service life than comparable units previously provided and immersed in the contents of the sump 3. The apparatus of the invention is not complicated and is readily accessible. Hence it is believed that the objects of the invention have been achieved.

While one complete embodiment of the invention has been disclosed herein, it will be appreciated that modification of this particular embodiment of the invention may be resorted to without departing from thes cope of the invention as defined in the appended claims.

What I claim is:

1. A sealed level control switch for sump pumps and the like comprising;

an enclosure means, a flexible diaphragm attached to and forming one wall portion of said enclosure means to enable the pressures inside and outside of said enclosure means to be balanced, an enclosed diaphragm type switch unit positioned within said enclosure means and including a chamber forming means, a flexible control diaphragm positioned in said chamber forming means to divide it into two separate sections, and contact means positioned in one of said sections which has the pressure within said enclosure means set up therein, control pressure supply means operatively connecting between said enclosure means and the other of said sections in said switch unit, and electric leads extending through said enclosure means in sealed engagement therewith and connecting to said switch unit whereby said switch unit is positioned in a sealed enclosure means where the pressure is that of the surrounding atmosphere and with a control pressure being applicable to said switch unit for operation thereof.

2. A sealed level control switch for sump pumps and the like comprising;

an enclosure means forming a portion of an enclosure, a flexible diaphragm secured to said enclosure means to complete the enclosure provided thereby, an enclosed diaphragm type switch unit having a frame engaging the periphery of the diaphragm positioned within said enclosure means and with one face of the diaphragm and the frame of the switch unit forming a pressure compartment therein, said switch unit having a pressure transmitting port provided therein connecting to said pressure compartment and switch means operatively associated with said diaphragm of said switch unit to be opened and closed by movement thereof, a pressure transmitter means connecting to said pressure transmitting port and extending at least to a margin of said enclosure means for connection to a pressure control source, and electric power supply and control means extending through said enclosure means in sealed engagement therewith for external connection to power supply and control means, said electric power supply and control means connecting to said switch unit.

3. A sealed level control switch for sump pumps and the like comprising;

an enclosure means including a flexible diaphragm forming one wall portion thereof, an enclosed diaphragm type switch unit positioned within said enclosure means and with one face of the diaphragm of said switch unit forming a pressure compartment therein, the other face of said diaphragm having the pressure within said enclosure means applied thereto, said switch unit having a pressure transmitting port provided therein connecting to said pressure compartment and switch means operatively associated with said diaphragm of said switch unit to be opened and closed by movement thereof, a pressure transmitter means connecting to said pressure transmitting port and extending at least to a margin of said enclosure means, remotely positioned control pressure supply means connected to said pressure transmitter means to vary the pressure in said pressure compartment for control action, and electric power supply and control means extending through said enclosure means in sealed engagement therewith for external connection to power supply and control means, said electric power supply and control means connecting to said switch unit.

4. A sealed level control switch for sump pumps and the like comprising;

an enclosure means responsive to the atmospheric pressure to provide atmospheric pressure therein, a pressure actuated switch unit including an operative diaphragm positioned within said enclosure means and having atmospheric pressure exerted on one face of said diaphragm, control pressure supply means operatively connecting between said enclosure means and the other face of said diaphragm of said switch unit to apply a control pressure thereto, a remotely positioned control pressure receiving means, means connecting said control pressure receiving means to said control pressure supply means to transmit control pressure thereto, and electric leads extending through said enclosure means in sealed engagement therewith and connecting to said switch unit.

5. A sealed level control switch for sump pumps and the like comprising;

an enclosure means forming a portion of an enclosure, a flexible diaphragm secured to said enclosure means to complete the enclosure provided thereby, a diaphragm type switch unit positioned within said enclosure means and with a frame and one face of the diaphragm of the switch unit forming a pressure compartment therein, the other face of said diaphragm having the pressure within said enclosure means applied thereto, said switch unit having a pressure transmitting port provided therein connecting to the one face of said diaphragm, and switch means operatively associated with said diaphragm of said switch unit to be opened and closed by movement thereof, sealed control pressure supply means adapted to be positioned in a sump for measuring the depth of material received therein by the pressure exerted on said control pressure supply means, a pressure transmitter means operatively connecting said pressure transmitting port to said control pressure supply means for controlling said switch unit by the pressure in said pump, and electric power supply and control means extending through said enclosure means in sealed engagement therewith for external connection to power supply and control means, said electric power supply and control means connecting to said switch unit and to a controlled pump for operation thereof whereby the pressure from said control pressure supply means is opposed for control action at all times by atmospheric pressure.

6. A sealed level control switch for sump pumps and the like comprising;

an enclosure means forming a portion of an enclosure, a flexible diaphragm secured to said enclosure means to complete the enclosure provided thereby, an enclosed diaphragm type switch unit having a frame positioned within said enclosure means and with said frame and one face of the diaphragm of the switch unit forming a pressure compartment therein, the other face of said diaphragm having the pressure within said enclosure means applied thereto, switch means operatively associated with said diaphragm of said switch unit to be opened and closed by movement thereof, remotely positioned control pressure supply means for measuring the pressure set up by material received in the sump, a pressure transmitter means operatively connecting said pressure compartment to said control pressure supply means for controlling said switch unit by the pressure set up by material received in said sump, and electric power supply and control means connecting to said switch unit and extending through said enclosure means in sealed engagement therewith for external connection to power supply and control means whereby a sealed enclosure means is provided for said switch unit and excessive moisture can not collect thereadjacent.

References Cited in the file of this patent

UNITED STATES PATENTS

| | | |
|---|---|---|
| 2,921,159 | Elderton et al. | Jan. 12, 1960 |
| 2,922,002 | Gilman | Jan. 19, 1960 |
| 3,091,676 | Koster | May 28, 1963 |